Feb. 10, 1931.  J. M. LARSON  1,792,101
THERMOSTATIC CONTROL FOR HEATING SYSTEMS
Filed Feb. 11, 1929  8 Sheets-Sheet 2
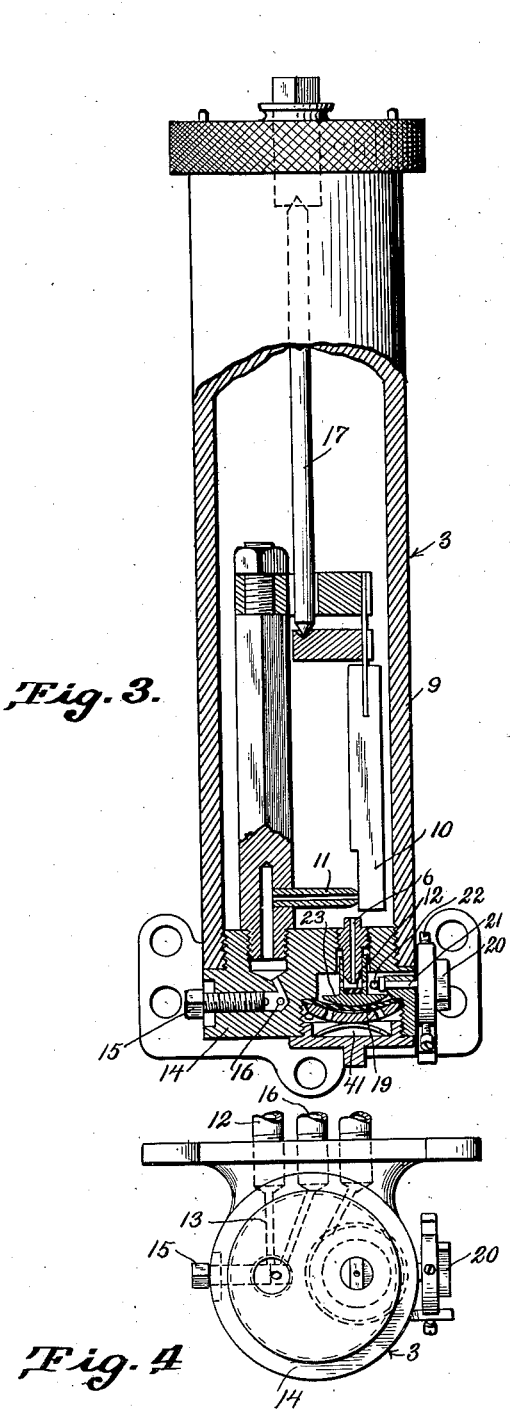
Fig. 3.
Fig. 4.
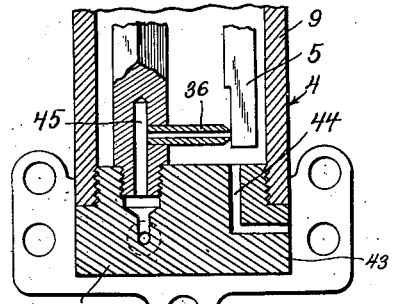
Fig. 6.
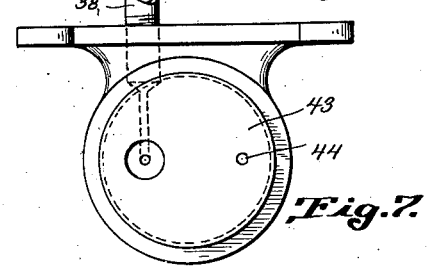
Fig. 7.
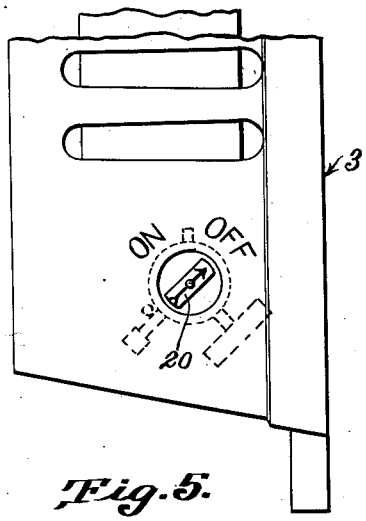
Fig. 5.
Inventor:
John M. Larson
By Jones, Addington, Ames & Seibold
Att'ys.

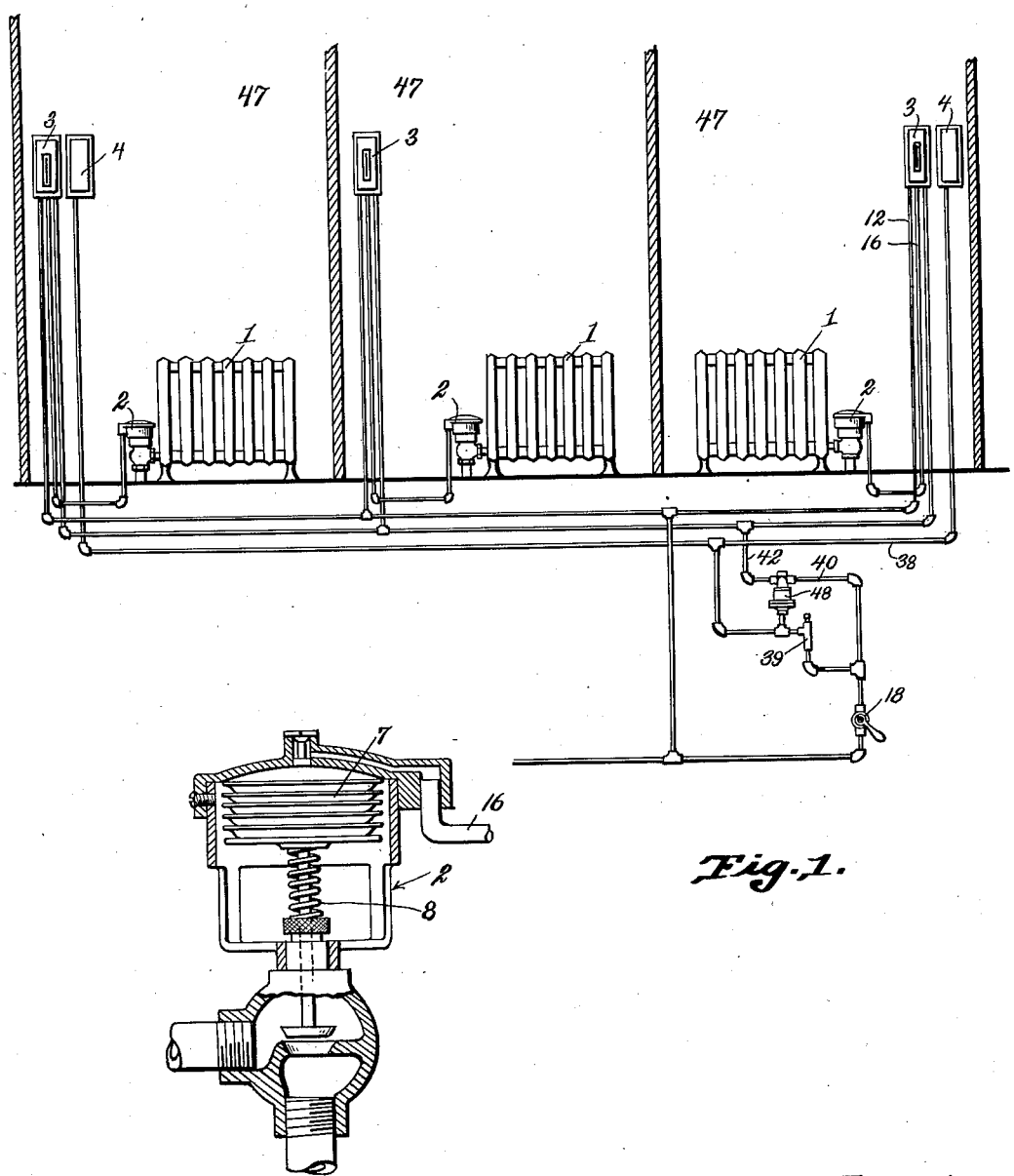

Feb. 10, 1931.  J. M. LARSON  1,792,101
THERMOSTATIC CONTROL FOR HEATING SYSTEMS
Filed Feb. 11, 1929   8 Sheets-Sheet 3

Inventor:
John M. Larson
By Jones, Addington, Ames & Seibold
Att'ys.

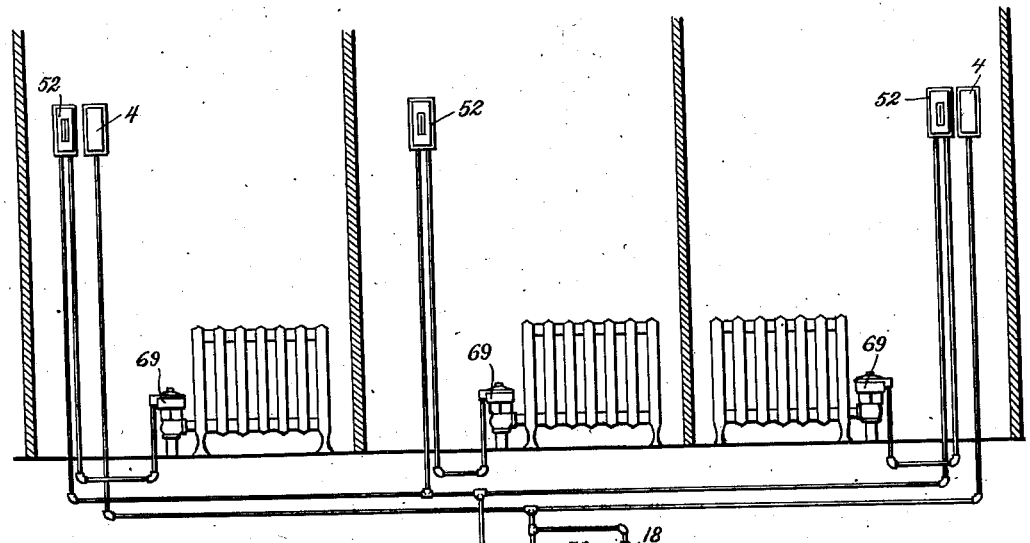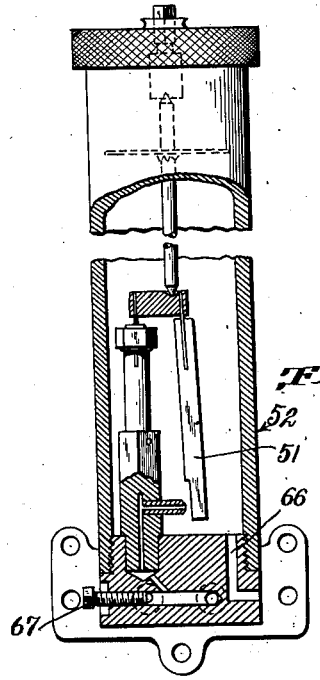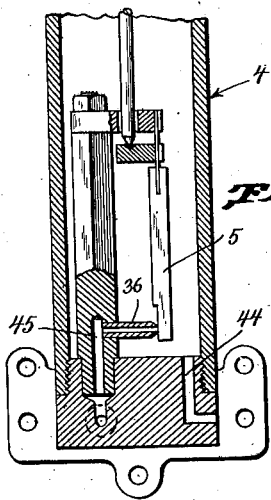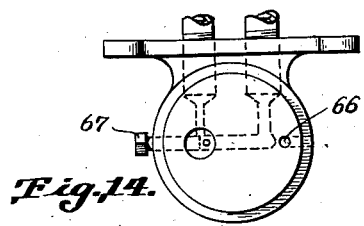

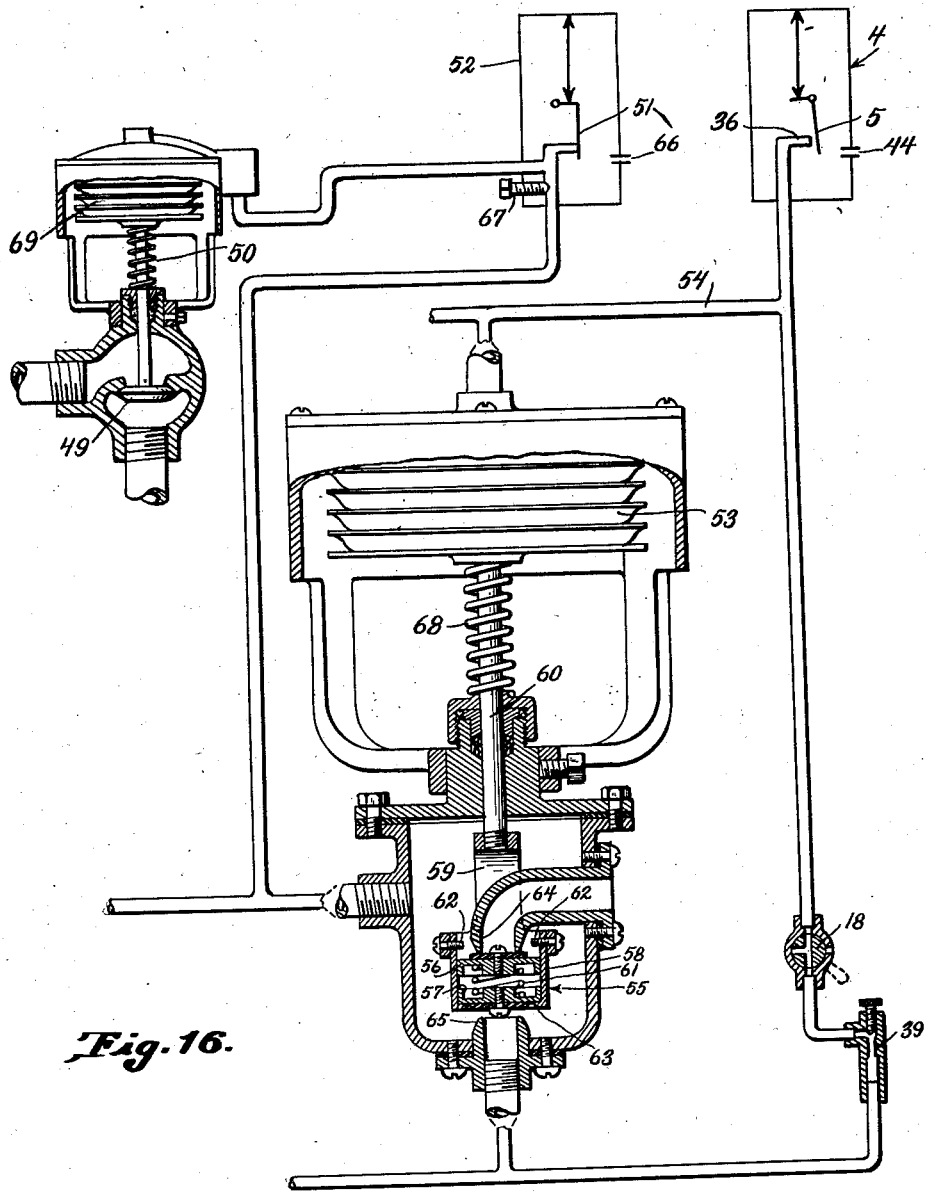

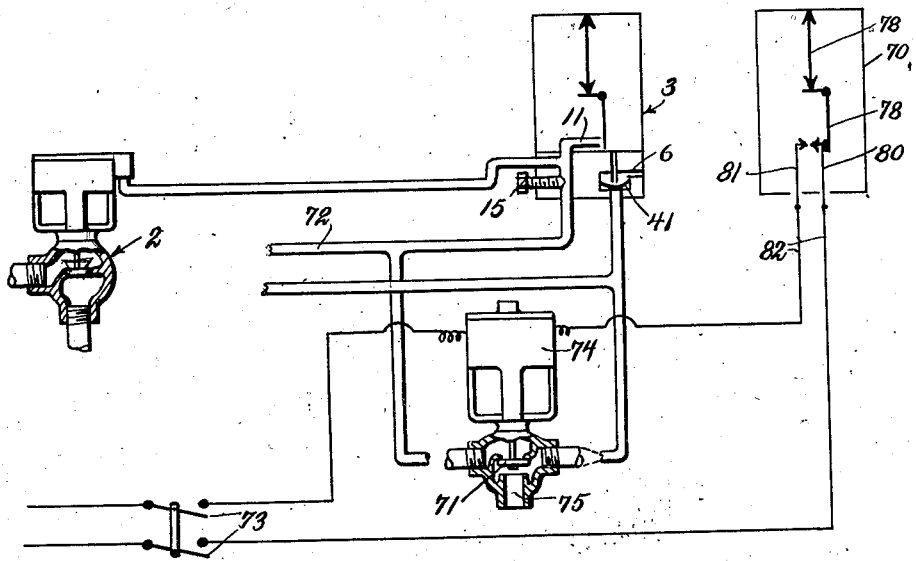
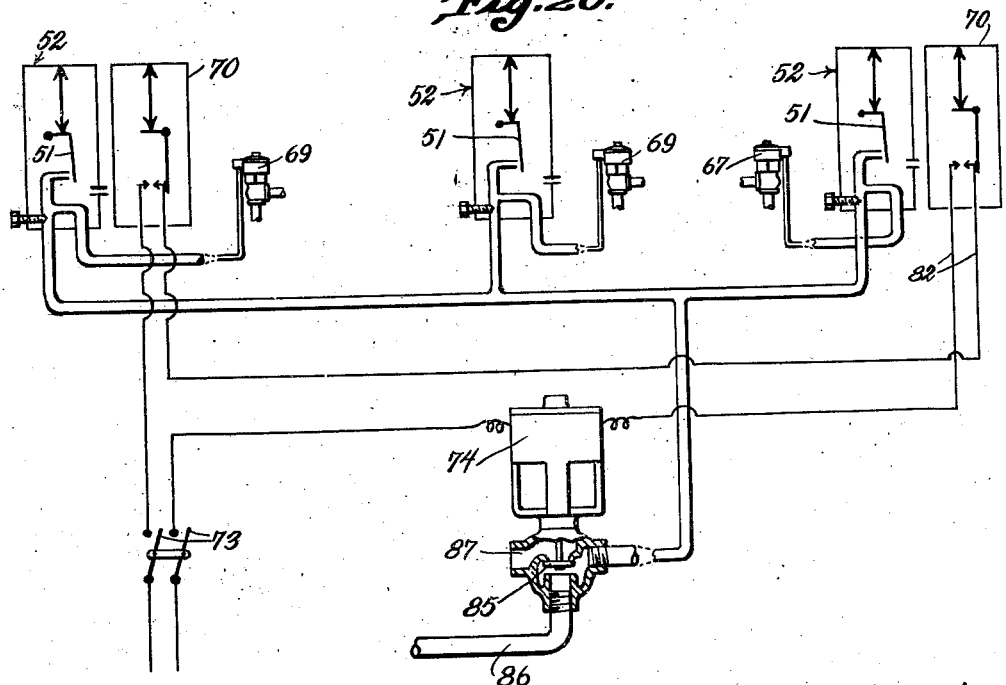

Patented Feb. 10, 1931

1,792,101

UNITED STATES PATENT OFFICE

JOHN M. LARSON, OF CHICAGO, ILLINOIS, ASSIGNOR TO NATIONAL REGULATOR COMPANY, OF CHICAGO, ILLINOIS, A CORPORATION OF ILLINOIS

THERMOSTATIC CONTROL FOR HEATING SYSTEMS

Application filed February 11, 1929. Serial No. 338,944.

My invention relates to thermostatic control for heating systems.

One of the objects of my invention is to provide improved means whereby a number of rooms may be automatically kept at a normal temperature during the day time or period of occupancy and whereby the thermostatic means may, when desired, be rendered ineffective to maintain the normal room temperature at night or during a period of non-occupancy, in order to save fuel, and whereby, in the event the temperature in the building becomes dangerously low, the ineffective normal temperature thermostats will again become effective to tend to raise the room temperature.

A further object of my invention is to provide improved means whereby a number of rooms may be automatically kept at a normal temperature during the day time and whereby the thermostatic means may, when desired, be rendered ineffective to maintain the normal room temperature and whereby in the event the temperature in the building becomes dangerously low a safety thermostat will automatically cause the heat supply controllers to be actuated to maintain a temperature above the danger point.

Further objects will appear from the description and claims.

In the drawings, in which several forms of my invention are shown,

Figure 1 is a diagrammatic view in vertical section showing my improved system;

Fig. 2 is an axial section of one of the actuators for the radiator valve;

Fig. 3 is an axial sectional view of one of the normal temperature thermostats;

Fig. 4 is a plan view of the base of the thermostat;

Fig. 5 is a side view of the lower part of the thermostat;

Fig. 6 is an axial sectional view of the lower part of the safety or pilot thermostat;

Fig. 7 is a plan view of the base of the safety thermostat;

Fig. 12 is a diagrammatic vertical section showing a different form of thermostat construction;

Fig. 13 is an axial sectional view of the normal temperature thermostat of Fig. 12;

Fig. 14 is a plan view of the base of the normal temperature thermostat;

Fig. 15 is an axial sectional view of the safety thermostat of Fig. 12;

Fig. 16 is a diagrammatic view showing the relation of the various pieces of apparatus used in Fig. 12;

Fig. 20 shows diagrammatically the control of Fig. 17; and

Fig. 21 shows diagrammatically another form of control.

Figures 8, 9:
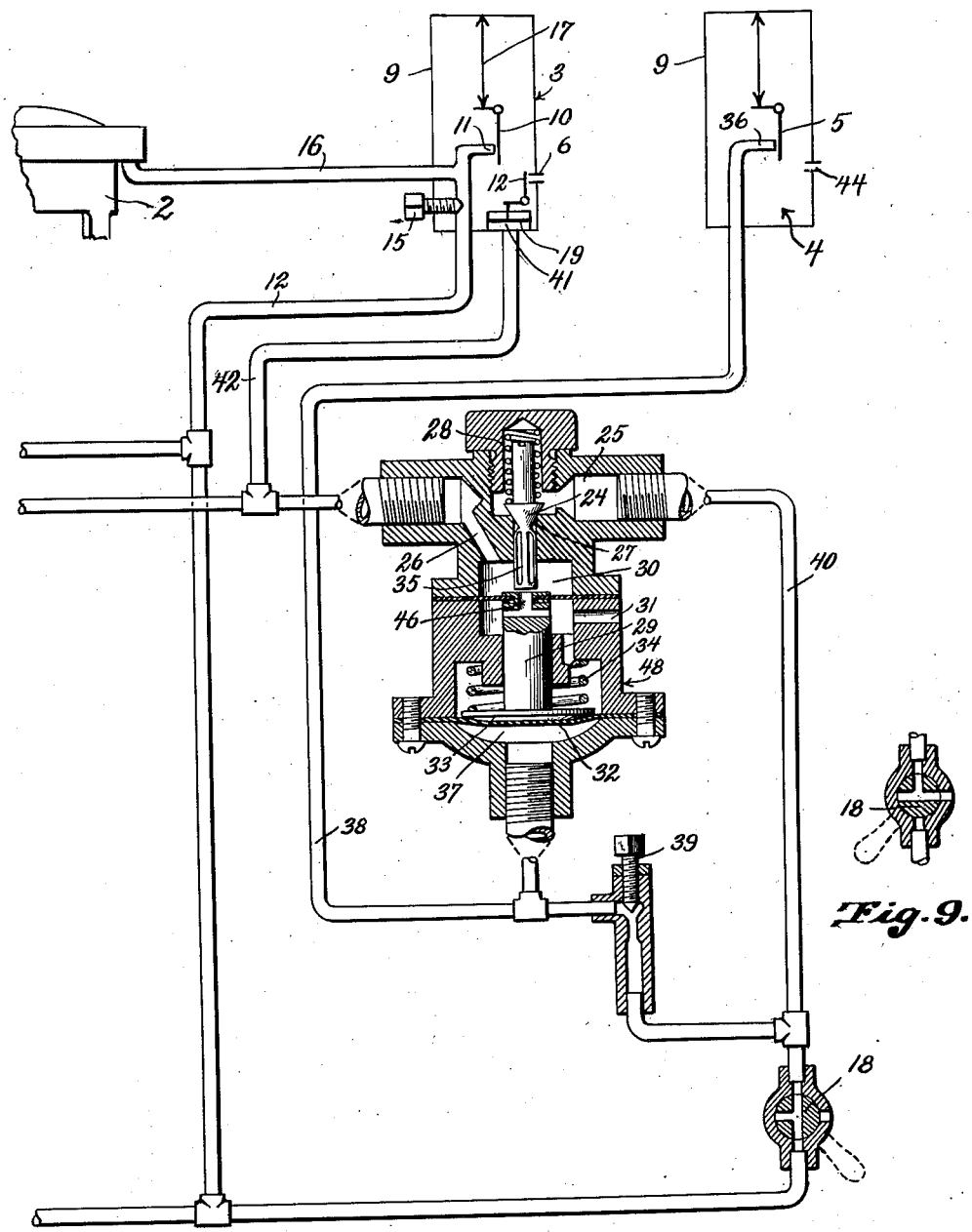
Fig. 8 is a diagrammatic view showing the relation of the various pieces of apparatus to each other.
Fig. 9 is a view showing one position of a control valve.

Referring to the drawings in detail, and first to the construction shown in Figs. 1 to 11, inclusive, this comprises a plurality of radiators 1, one for each room, a plurality of fluid pressure actuators 2, one for each radiator valve, a plurality of normal temperature thermostats 3, one for each radiator valve, one or more safety thermostats 4, each one of which controls a plurality of the normal temperature thermostats, and means whereby, when desired, all of the normal temperature thermostats may be rendered ineffective to maintain normal temperature and whereby when the room temperature becomes dangerously low the pilot thermostat or thermostats will cause the then ineffective normal temperature thermostats to become effective again and to tend to raise the room temperature.

In order to give a general idea of the system, I will first briefly describe the operation in connection with Figs. 1, 2 and 8. The radiator valves are closed by fluid pressure and opened by spring pressure. The normal temperature thermostat may be set so that its valve will be closed above 70° Fahrenheit and opened below 70°. The safety thermostat 4 may be set so that its valve will be closed above 40° Fahr. and opened below 40°. Each normal temperature thermostat has a contrivance which may, when desired, be operated to close the port leading from the thermostat chamber to thereby render the normal temperature thermostat ineffective. When the normal temperature thermostats are ineffective, the room temperature will, of course, drop. If the temperature drops to a dangerously low point (below 40° Fahr.) the safety thermostatic valve will open and this will cause the ports of the normal temperature thermostats to open, thereby rendering the normal thermostats again effective to tend to maintain normal room temperature. As soon, however, as the temperature of the room in which the controlling pilot thermostat is located, rises above 40°, the valve 5 of this safety thermostat will close, which will cause the ports 6 leading from the normal temperature thermostats to be closed, thereby rendering the normal temperature thermostats ineffective again, and thus maintaining the temperature around 40° Fahr.

I will now describe in more detail the various pieces of apparatus used in the system. The pneumatic actuator 1 for the radiator valve may be of any usual or suitable construction, comprising an expansible fluid chamber 7 which acts to close the radiator valve when fluid pressure is admitted thereto, and a coil compression spring 8 for opening the radiator valve when pressure is released from the expansible chamber.

The normal chamber thermostat Fig. 3 also may be of any usual or suitable construction, such, for instance, as the type shown in my Patent No. 1,650,993, and comprises a heat extensible chamber 9 in which is located a thermostatic valve 10 controlling a fluid pressure port 11, and a thermostat controlling valve 12 controlling the exhaust passage 6 leading from the extensible chamber 9 and thereby controlling the port 11. Fluid pressure is supplied to the port 11 through the conduit 12 and passage 13 in the base 14 of the thermostat, which passage is suitably restricted by means of an adjustable screw valve 15 so that when the thermostatic valve and controller valve are both open, the pressure in the passage 11 beyond the restricting valve 15 will become practically atmospheric, thus reducing the pressure in the conduit 16 leading to the pneumatic radiator valve actuator 2 to atmospheric also and permitting the spring 8 to open the radiator valve. Thus when the normal temperature thermostats are effective, the heat will be turned on when the room temperature drops below 70° as this causes the extensible chamber to contract and causes the push rod 17 to open the thermostatic valve 10.

At night, if it is desired to render the normal temperature thermostats ineffective, the three-way valve 18 is turned to the position shown in Fig. 8, which allows pressure to flow to the nozzle 36 which would be closed if room temperature is above 40°, pressure would build up under diaphragm 32 so pressure from 40 can enter 42, thus closing the thermostat controlling valves 12 and preventing escape of air from the thermostatic chambers 9, even when the thermostatic valves 10 are open. Under these conditions the radiator valves will remain closed, thus economizing on fuel.

If desired, the normal temperature thermostat may be provided with a device which will prevent the thermostatic controlling valve from being closed even when pressure is admitted under the actuating diaphragm. This construction comprises a turn-button 20 mounted on a rock shaft 21 having a rock arm 22 which can be moved to engage the upper face of the button 23 on the control valve 12, so that in this position the controlling valve can be forced open. Thus any desired room or rooms may be kept at a normal temperature if desired and reset when the switch is turned.

The construction by which the safety thermostat controls the normal temperature thermostats comprises a diaphragm actuated valve construction which in one position admits fluid pressure underneath the valve-controlling diaphragms 19 and in another position exhausts the fluid pressure from underneath these diaphragms. Such a construction is shown in my application Serial No. 115,701. Specifically, this construction comprises a spring-pressed valve 24 controlling communication between the passages 25 and 26, past the port 27, a coil compression spring 28 tending to hold this valve 24 closed, a ported plunger 29 for controlling communication between chamber 30, and exhaust passage 31, an actuating diaphragm 32 acting on the button 33 on the lower end of the plunger 29, and a coil compression spring 34 tending to hold the ported plunger 29 away from the lower end of the stem 35 of the valve 24.

The port 36 of the safety thermostat 4 is connected with the chamber 37 underneath the diaphragm 32 by the conduit 38. When the thermostatic valve 5 is opened the pressure in the conduit 38 and in the chamber 37 is substantially atmospheric, due to the restriction effected by the screw valve 39. The right-hand passage 25 in the valve casing is connected with the pressure line through the conduit 40 and three-way valve 18. The left-hand passage 26 in the valve casing is connected with the diaphragm chambers 41 of the normal temperature thermostats through the conduits 42.

The safety thermostat construction is similar to the construction of the normal temperature thermostat shown in Fig. 3 except that the base 43 of the safety thermostat shown in detail in Figs. 6 and 7 has an uncontrolled exhaust passage 44 from the thermostatic chamber 9 and there is no restricting valve for the passage 45 connected with the line pressure conduit 38, nor any passageway for connection with a fluid pressure actuator.

When, as shown in Fig. 8, the safety thermostatic valve 5 is opened the pressure underneath the diaphragm 32 is relieved and the diaphragm chambers 41 are connected with exhaust through the conduits 42, passage 26, port 46 and exhaust passage 31. When the safety thermostatic valve 5 is closed pressure accumulates in the conduit 38 and underneath the diaphragm 32 forcing the ported plunger 29 upward. When the upper end of the plunger engages the lower end of the valve stem 35 the port 46 through the plunger is closed and the passage 26 is cut off from the exhaust. Further movement of the diaphragm 32 will lift the valve 24 from its seat and open communication between the passages 25 and 26 through the valve port 27, thus connecting the diaphragm chambers 41 with the line pressure and closing the thermostat controlling valves 12.

Thus, when the room temperature for the safety thermostat falls below 40°, causing the safety thermostat valve to open the ported plunger 29 will move downward under the action of the spring 34 and will permit the air in the diaphragm chambers 41 to exhaust, thus opening the control valves 12 and rendering the normal temperature thermostats effective. However, as soon as the action of the normal temperature thermostats has brought the room temperature above 40°, the safety thermostat valve 5 will close causing the ported plunger 29 to be raised to cut off the diaphragm chambers 41 from exhaust and connect them with line pressure. This will close the thermostat control valves 12 and render the normal temperature thermostats ineffective again.

Thus, the normal temperature thermostats may be rendered normally ineffective when desired, but if the room temperature drops to the danger point the safety thermostats will render the normal temperature thermostats effective to maintain a safe temperature.

Figure 10:
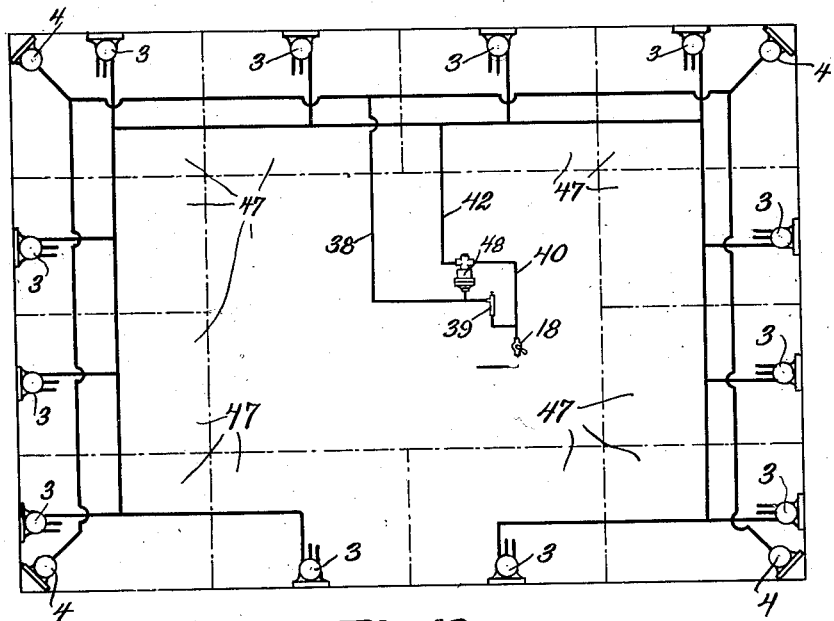
Fig. 10 is a diagrammatic plan view showing one arrangement of the thermostats in a building.

In Fig. 10 is shown one arrangement of safety and normal temperature thermostats. In this arrangement a normal temperature thermostat 3 is placed in each room 47 and a safety thermostat 4 is placed in each corner room. All four of the safety thermostats are connected with the chamber 37 underneath the diaphragm 32 of the controller 48 for the control valves 24, so that if the temperature in either one of the four corner rooms falls to the danger point the safety thermostats in the room where this occurs will vent the diaphragm chamber and bring all of the normal temperature thermostats 3 into effective condition.

Figure 11:
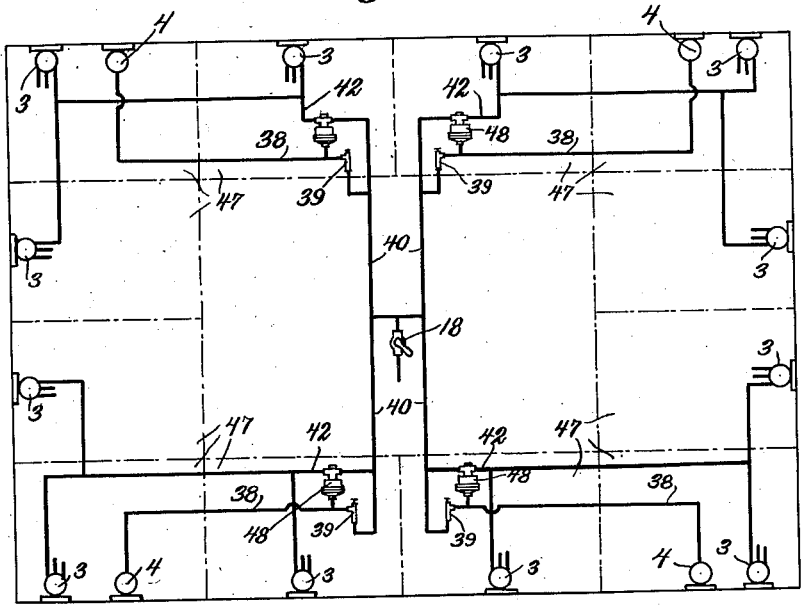
Fig. 11 is a diagrammatic plan view showing another arrangement of thermostats.
Figure 17:
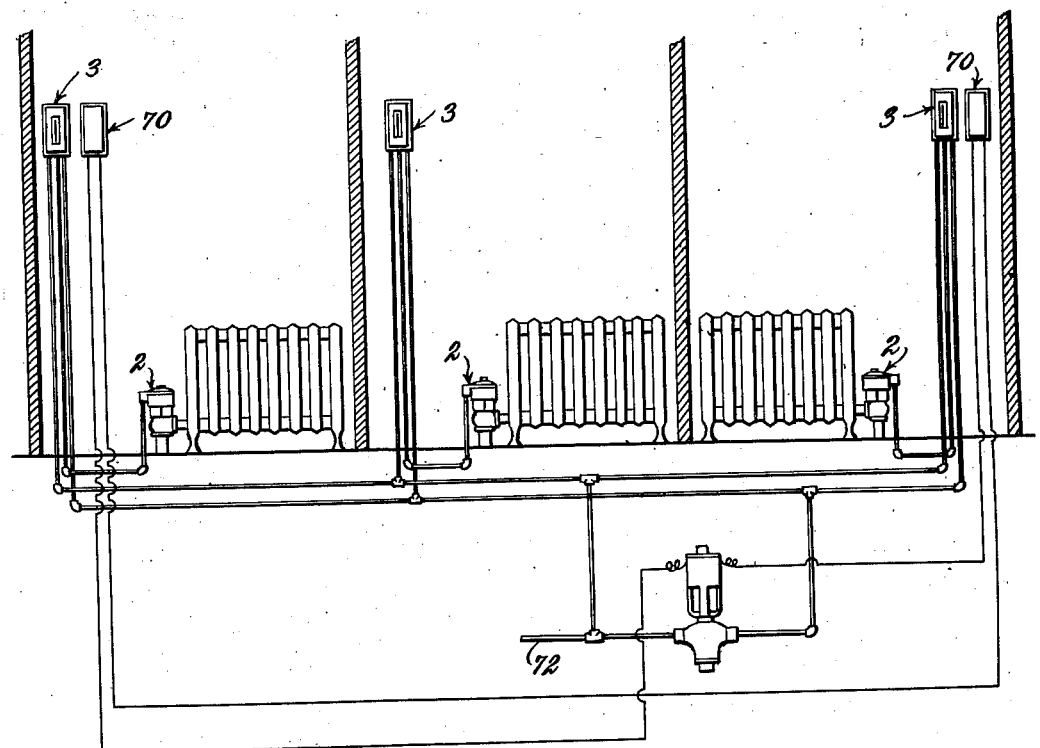
Fig. 17 is a diagrammatic vertical sectional view showing a system in which an electrically controlled safety thermostat is used.

In Fig. 11 is shown another arrangement of safety thermostats 4 and normal temperature thermostats 3. In this arrangement a normal temperature thermostat 3 is placed in each room and a safety thermostat 4 is placed in each corner room just as in Fig. 10, but here the arrangement is such that each safety thermostat controls its own set of normal temperature thermostats. To accomplish this each safety thermostat is provided with its own diaphragm controller 48, each of which, as shown, controls three of the normal temperature thermostats.

The construction shown in Figs. 12 to 16, inclusive, is similar to that just described except that here the radiator valve 49 is opened by fluid pressure and closed by the pressure of the spring 50 and the thermostatic valve 51 of the normal temperature thermostat 52 is opened above 70° F. and closed below 70° F.

In this form, also, a somewhat different form of controller for the normal temperature thermostats is provided. This controller comprises a fluid expansible chamber 53 connected with the safety thermostat port 36 by the conduit 54 and a double-faced valve 55 actuated by the fluid expansible chamber, which valve in one position closes the exhaust port, leaving the supply port open and in its other position closes the supply port, leaving the exhaust port open. The double-faced valve 55 is so constructed that exhaust port and supply port will never be open at the same time. For this purpose the two-valve members 56 and 57 are slidably mounted in a sleeve 58 secured by a yoke 59 to the valve stem 60 and a coil compression spring 61 is placed between the two valve members 56 and 57 tending to hold them apart. The movement of the upper valve member 56 relative to the sleeve 58 is limited by a pair of stop screws 62 and the movement of the lower valve member 57 relative to the sleeve is limited by a stop flange 63 on the sleeve 58. With this construction, assuming that the valve 55 is in the position shown in Fig. 16 and is moved from this position downwardly the coil spring 61 will hold the exhaust valve member 56 against the exhaust port 64 during the downward movement until the supply valve member 57 has engaged the supply port 65 after which the stop screws 62 will engage the upper face of the exhaust valve member 56 and cause the exhaust port 64 to be opened. Similarly, when the valve 55 is being moved upwardly the coil compression spring 61 will hold the supply valve member 57 closed until the exhaust valve member 56 engages the exhaust port 64 after which the flange 63 will engage the supply valve member 57 and lift it from engagement with the supply port 65.

A three-way control valve 18 and a restriction screw valve 39 similar to those shown in Fig. 8 are provided for controlling the action of the safety thermostat.

The normal temperature thermostat shown in Figs. 13 and 14 comprises a thermostatic valve 51 which is open when the room temperature is above normal and closed when the room temperature is below normal (the reverse of that shown in Fig. 3), the result being that when the thermostatic valve is open the pressure in the pneumatic actuator for the radiator valve will drop to atmospheric, permitting the spring 50 to close the radiator valve 49 to shut off the heat and when the thermostatic valve is closed the pressure will build up in the fluid pressure actuator, opening the radiator valve to turn on the heat. An unobstructed exhaust passage 66 is provided from the thermostatic chamber and a restriction screw 67 is provided whereby the fluid flow may be so restricted that when the thermostatic valve 51 is open the pressure on the low pressure side of the restriction valve will be reduced almost to atmospheric.

The safety thermostat construction, shown in detail in Fig. 15, is identical with that shown in Fig. 6.

In use, for maintaining normal temperature in the daytime the three-way valve 18 is turned to the position shown in Fig. 9, in which position the fluid pressure actuator 53 for the three-way valve 55 will be cut off from the line pressure and the compression spring 68 will hold the double-faced valve 55 in the position shown in Fig. 16, in which the exhaust port 64 is closed and the supply port 65 is open.

Under these conditions the normal temperature thermostat 52 is connected with line pressure and will be effective to maintain the desired normal temperature. For the period of nonoccupancy the three-way valve 18 is turned to the position shown in Fig. 16 in which line pressure is supplied to the fluid pressure actuator 53 and the safety thermostat. As the safety thermostat valve 5 is closed so long as the temperature is above the danger point, pressure will build up in the pneumatic actuator 53 and close the supply port 65 and open the exhaust port 64. This will permit the pressure in the radiator valve actuator 69 to exhaust through the exhaust port 64 in spite of the fact that the normal temperature thermostat valve 51 may be closed. The radiator valve will thus be closed and the room temperature will fall until the danger point is reached, whereupon the safety thermostat valve 5 will open. This will cause the pressure in the pneumatic actuator 53 to become substantially atmospheric because of the restriction valve 39, the air being exhausted through the safety thermostat faster than it can be supplied through the restriction valve 39. The compression spring 68 will thereupon move the valve 55 back to the position shown in Fig. 16, closing the exhaust port 64 and opening the supply port 65. This will cause pressure to build up in the radiator valve actuator 69 (since the normal temperature thermostat valve 51 is closed) and will cause the radiator valve to open to turn on the heat. As soon as the room temperature rises above the danger point the safety thermostat valve 5 will close, causing the exhaust port 64 to be opened and the supply port 65 to be closed and thus again closing the radiator valve to shut off the heat.

In Figs. 17, 18, 19 and 20 is shown a system in which an electrical safety thermostat 70 is provided for preventing the room temperature from dropping below the safety point when the normal temperature thermostats are put out of commission. In this form the radiator valve 2 is the same as that shown in Fig. 2 and the normal temperature thermostat 3 is the same as that shown in Figs. 3 and 8. During the day or normal temperature period the three-way valve 71 is in raised position so that the diaphragm 41 of the normal temperature thermostat is cut off from the pressure line 72 and the thermostat operates to maintain normal temperature. At night, however, or whenever it is desired that the temperature should not be kept up to normal the switch 73 is closed energizing the solenoid 74 and causing the valve 71 to move to its lower position to close the exhaust port 75 and admit pressure underneath the diaphragm 41. This raises the diaphragm 41 closing the exhaust port 6 from the thermostat chamber and thus renders the normal temperature thermostat inoperative. The temperature thereupon drops until the electrical thermostat 70 opens the circuit through the solenoid 74 whereupon the spring 76 raises the valve 71, closing the pressure port 77 and opening the exhaust port 75 and permitting the diaphragm 41 to drop to open the exhaust port 6 of the normal temperature thermostat 3 and render this normal temperature thermostat again operative. The normal temperature thermostat will thereupon cause the radiator valve to open and turn on the heat until the temperature is again above the danger point, whereupon the electrical safety thermostat will close the circuit through the solednoid 74 and the valve 71 will again be brought to its lower position closing the exhaust port 75 and opening the pressure port 77 to again render the normal temperature thermostats ineffective.

Figure 18:
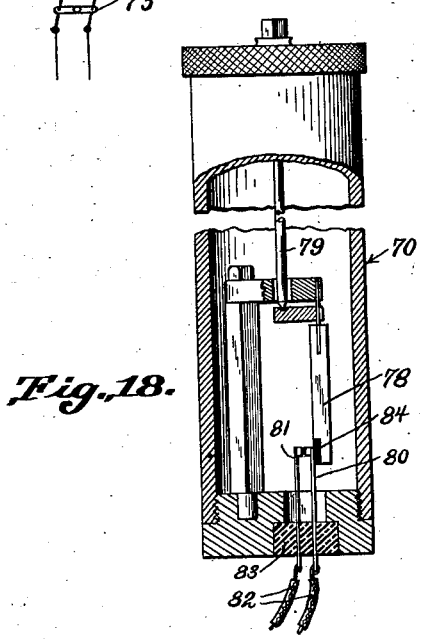
Fig. 18 is a vertical sectional view of the thermostat of Fig. 17.
Figure 19:
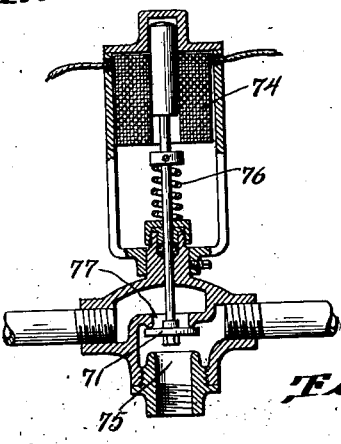
Fig. 19 is a vertical sectional view of the solenoid operated valve of Fig. 17.

The construction of the electrical safety thermostat, shown in detail in Fig. 18, is somewhat similar to the construction of the safety thermostat shown in Figs. 6 and 8, except that the oscillatable member 78 controlled by the push rod 79 acts on a flexible contact member 80 movable into and out of engagement with respect to another flexible contact member 81, these contact members being connected with the wires 82 of the solenoid circuit. These contacts may be mounted in a suitable insulating block 83 and a suitable piece of insulation 84 may be provided on the oscillatable member 78 where it engages the flexible contact 80.

In Fig. 21 is shown another form of control in which the radiator valves and normal temperature thermostats 52 are of the type shown in Fig. 16. In this form a solenoid operated valve 85 is provided which in one position connects the normal temperature thermostats 52 with line pressure in the conduit 86 and in another position connects the normal temperature thermostats with exhaust 87.

In the daytime or during the normal temperature period the switch 73 for the solenoid 74 is open and the normal temperature thermostats 52 control the temperature just as in the form shown in Fig. 16. When, however, it is not desired to maintain the normal temperature the switch 73 for the solenoid circuit is closed energizing the solenoid 74 and moving the valve 85 to its lower position to cut off the normal temperature thermostats from pressure and open them to exhaust 87. This exhausts the actuators 69 of the radiator valves, permitting them to close, causing the temperature to drop. As soon, however, as the temperature drops to a dangerous point the electrical thermostat 70 opens the solenoid circuit, permitting the spring 76 to raise the valve 85, thus connecting the normal temperature thermostats 52 with line pressure 86 and as the normal temperature thermostat valves 51 are closed this will cause pressure to accumulate in the actuator 69 of the radiator valves to open these valves and turn on the heat. As soon, however, as the temperature has risen above the danger point the electrical safety thermostat 70 will close the solenoid circuit, causing the valve 85 to be moved to its lower position, again connecting the normal temperature thermostats with exhaust 87 and causing the closing of the radiator valves.

It is obvious that I have thus provided a construction in which a number of rooms may be automatically kept at a normal temperature during the daytime and whereby when desired the normal temperature thermostatic means may be rendered ineffective to maintain a normal room temperature and whereby in the event the temperature in the building becomes dangerously low a safety thermostat will so control the heat supply controllers as to maintain the temperature above the danger point.

While I have shown several forms of my invention, it is obvious that it may be embodied in other forms covered and defined by the appended claims.

I claim:

1. A thermostatic control system for controlling the supply of heat to a plurality of compartments comprising a plurality of heat supply controllers, one for each compartment, a normal temperature thermostat in each compartment for controlling the heat supply controller for that compartment to cause it to maintain a normal temperature when desired, disabling means whereby said thermostats may be rendered normally ineffective to maintain normal temperature when desired, a safety thermostat common to a plurality of said normal temperature thermostats and means whereby when the temperature reaches a predetermined degree the safety thermostat will cause the normally ineffective thermostats to become effective to tend to maintain a safe temperature.

2. A thermostatic control system for controlling the supply of heat to a plurality of compartments comprising a plurality of heat supply controllers, one for each compartment, a normal temperature thermostat in each compartment for controlling the heat supply controller for that compartment to cause it to maintain a normal temperature when desired, disabling means whereby said thermostats may be rendered normally ineffective to maintain normal temperature when desired, a safety thermostat common to a plurality of said normal temperature thermostats, means whereby when the temperature reaches a predetermined degree the safety thermostat will cause the normally ineffective thermostats to become effective to tend to maintain a safe temperature, said normal temperature thermostat comprising a chamber having inlet and exhaust ports and a thermostatic valve in said chamber controlling the inlet port and said means for rendering the normal temperature thermostat ineffective comprising a power actuated valve for controlling the exhaust port.

3. A thermostatic control system for controlling the supply of heat to a plurality of compartments comprising a plurality of heat supply controllers, one for each compartment, a normal temperature thermostat in each compartment for controlling the heat supply controller for that compartment to cause it to maintain a normal temperature when desired, disabling means whereby said thermostats may be rendered normally ineffective to maintain normal temperature when desired, a safety thermostat common to a plurality of said normal temperature thermostats, means whereby when the temperature reaches a predetermined degree the safety thermostat will cause the normally ineffective thermostats to become effective to tend to maintain a safe temperature, said normal temperature thermostat comprising a chamber having inlet and exhaust ports and a thermostatic valve in said chamber controlling the inlet port and said means for rendering the normal temperature thermostat ineffective comprisng a power actuated valve for controlling the exhaust port and said means whereby the normally ineffective thermostats become effective comprising means whereby when the temperature reaches a certain degree said safety thermostat controls said power actuated valve to render it ineffective to close the exhaust port.

4. A thermostatic control system for controlling the supply of heat to a plurality of compartments comprising a plurality of heat supply controllers, one for each compartment, a temperature thermostat in each compartment for controlling the heat supply controller for that compartment to cause it to maintain a normal temperature when desired, disabling means whereby said thermostats may be rendered normally ineffective to maintain normal temperature when desired, a safety thermostat common to a plurality of said normal temperature thermostats, means whereby when the temperature reaches a predetermined degree the safety thermostat will cause the normally ineffective thermostats to become effective to tend to maintain a safe temperature, said normal temperature thermostat comprising a chamber having inlet and exhaust ports and a thermostatic valve in said chamber controlling the inlet port and said means for rendering the normal temperature thermostat ineffective comprising a fluid pressure actuated valve for controlling the exhaust port, said means whereby the normally ineffective thermostats become effective comprising means whereby when the temperature reaches a certain degree said safety thermostat controls said fluid pressure actuated valve to render it ineffective to close the exhaust port, said last means comprising means whereby the fluid pressure acting on said pressure actuated valve may be varied.

5. A thermostatic control system for controlling the supply of heat to a plurality of compartments comprising a plurality of heat supply controllers, one for each compartment, a normal temperature thermostat in each compartment for controlling the heat supply controller for that compartment to cause it to maintain a normal temperature when desired, disabling means whereby said thermostats may be rendered normally ineffective to maintain normal temperature when desired, a safety thermostat common to a plurality of said normal temperature thermostats, means whereby when the temperature reaches a predetermined degree the safety thermostat will cause the normally ineffective thermostats to become effective to tend to maintain a safe temperature, said normal temperature thermostat comprising a chamber having inlet and exhaust ports and a thermostatic valve in said chamber controlling the inlet port and said means for rendering the normal temperature thermostat ineffective comprising a fluid pressure actuated valve for controlling the exhaust port, said means whereby the normally ineffective thermostats become effective comprising means whereby when the temperature reaches a certain degree said safety thermostat controls said fluid pressure actuated valve to render it ineffective to close the exhaust port, said last means comprising means whereby the fluid pressure acting on said pressure actuated valve may be varied, said safety thermostat comprising a chamber having inlet and exhaust ports and a thermostatic valve controlling said inlet port to control said variable fluid pressure.

6. A thermostatic control system for controlling the supply of heat to a plurality of compartments comprising a plurality of heat supply controllers, one for each compartment, a normal temperature thermostat in each compartment for controlling the heat supply controller for that compartment to cause it to maintain a normal temperature when desired, disabling means whereby said thermostats may be rendered normally ineffective to maintain normal temperature when desired and means comprising a safety thermostat common to a plurality of said heat supply controllers whereby when the temperature reaches a predetermined degree the heat supply controllers corresponding to the normally ineffective thermostats will be actuated to tend to maintain a safe temperature.

In witness whereof, I have hereunto subscribed my name.

JOHN M. LARSON.